US007076487B2

(12) United States Patent
Liechty et al.

(10) Patent No.: US 7,076,487 B2
(45) Date of Patent: Jul. 11, 2006

(54) SINGLE-PASS LOW-STORAGE ARBITRARY PROBABILISTIC LOCATION ESTIMATION FOR MASSIVE DATA SETS

(75) Inventors: John C. Liechty, State College, PA (US); James P. McDermott, State College, PA (US); Dennis K.J. Lin, State College, PA (US)

(73) Assignee: The Penn State Research Foundation, University Park, PA (US)

( * ) Notice: Subject to any disclaimer, the term of this patent is extended or adjusted under 35 U.S.C. 154(b) by 431 days.

(21) Appl. No.: 10/121,131

(22) Filed: Apr. 11, 2002

(65) Prior Publication Data

US 2003/0078924 A1 Apr. 24, 2003

Related U.S. Application Data

(60) Provisional application No. 60/283,003, filed on Apr. 11, 2001.

(51) Int. Cl.
  *G06F 17/30* (2006.01)
  *G06F 7/00* (2006.01)
(52) U.S. Cl. .............. 707/7; 707/2; 707/3; 707/104.1
(58) Field of Classification Search .............. 707/1.5, 707/2, 3, 7, 104.1
See application file for complete search history.

(56) References Cited

U.S. PATENT DOCUMENTS

| 5,664,171 | A | * | 9/1997 | Agrawal et al. ............... 707/2 |
| 5,809,499 | A | | 9/1998 | Wong et al. ................... 707/6 |
| 5,864,841 | A | * | 1/1999 | Agrawal et al. ............... 707/2 |
| 6,108,658 | A | * | 8/2000 | Lindsay et al. ............. 707/101 |
| 6,343,288 | B1 | * | 1/2002 | Lindsay et al. ................ 707/7 |
| 6,363,371 | B1 | | 3/2002 | Chaudhuri et al. ............ 707/2 |

OTHER PUBLICATIONS

Tierney, L. "A Space-Efficient Recursive Procedure for Estimating a Quantile of an Unknown Distribution", SIAM Journal on Scientific and Statistical Computing, vol. 4, No. 4, Dec. 1983, pp. 706-711.*

(Continued)

*Primary Examiner*—Luke S Wassum
(74) *Attorney, Agent, or Firm*—McKee, Voorhees & Sease, P.L.C.

(57) ABSTRACT

The present invention includes a method and system for providing an estimate of a summary of a data set generated by an unknown distribution. The method includes selecting a subset of data points from the data set, applying a scoring rule to each data point of the subset of data points based on an estimated relative location and an assigned weight for each data point to provide a score for each data point, selectively retaining data points to track based on the score for each data point; and determining an estimate of the summary of the data set based on the retained data points.

47 Claims, 5 Drawing Sheets

OTHER PUBLICATIONS

Jain, R. and Chlamtac, I. "The P2 Algorithm for Dynamic Calculation of Quantiles and Histograms Without Storing Observations", Communications of the ACM, vol. 28, No. 10, Oct. 1985, pp. 1076-1085.*

Agrawal, R. and Swami, A. "A One-Pass Space-Efficient Algorithm for Finding Quantiles", Proceedings of the 7th International Conference on Management of Data (COMAD), 1995.*

Hurley, C. and R. Modarres "Low-Storage Quantile Estimation", Computational Statistics, vol. 10, No. 4, 1995, pp. 311-325.*

Alsabti, K., S. Ranka and V. Singh "A One-Pass Algorithm for Accurately Estimating Quantiles for Disk-Resident Data", Proceedings of the 23rd VLDB Conference, 1997, pp. 346-355.*

Manku, G.S., S. Rajagopalan and B.G. Lindsay "Approximate Medians and other Quantiles in One Pass and with Limited Memory", Proceedings of the 1998 ACM SIGMOD International Conference on Management of Data, Jun. 1998, pp. 426-435.*

Manku, G.S., S. Rajagopalan and B.G. Lindsay "Random Sampling Techniques for Space Efficient Online Computation of Order Statistics of Large Datasets", Proc. of the 1999 ACM SIGMOD International Conference on Management of Data, Jun. 1999, pp. 251-262.*

Greenwald, M. and S. Khanna "Space-Efficient Online Computatuon of Quantile Summaries", Proceedings of the 2001 ACM SIGMOD International Conference on Management of Data, May 2001, pp. 58-66.*

Gilbert, A.C., Y. Kotidis, S. Muthukrishnan and M.J. Strauss "How to Summarize the Universe: Dynamic Maintenance of Quantiles", Proceedings of the 28th VLDB Conference, Aug. 2002, pp. 454-465.*

Liechty, J.C., D.K.J. Lin and J.P. McDermott "Single-Pass Low-Storage Arbitrary Quantile Estimation for Massive Datasets", Statistics and Computing, vol. 13, No. 2, 2003, pp. 91-100.*

Babu, G.J. and J.P. McDermott "Statistical Methodology for Massive Datasets and Model Selection", In Astronomical Data Analysis II, J-L Starck and F.D. Murtagh (Eds. ), Proceedings of SPIE, vol. 4847 (2002), pp. 228-237.*

Merriam-Webster Online "Definition of 'subset'", downloaded from www.m-w.com, Apr. 26, 2005.*

Oxford University Press "Definition of 'subset'", downloaded from www.askoxford.com, Apr. 26, 2005.*

InfoPlease "Definition of 'subset'", downloaded from www.infoplease.com, Apr. 26, 2005.*

Ultralingua "Definition of 'subset'", downloaded from www.ultralingua.net, Apr. 26, 2005.*

Mathematical Concepts, Inc. "Definition of 'subset'", downloaded from mathnstuff.com, Apr. 26, 2005.*

MathWorld "Definition of 'subset'", downloaded from mathworld.wolfram.com Apr. 26, 2005.*

MathWorld "Definition of 'proper subset'", downloaded from mathworld.wolfram.com, Apr. 26, 2005.*

"Sequential Estimation of Quantiles", Technical Report TR-COSC May 1998.

"Incremental Quantile Estimation for Massive Tracking" 2000 Proceedings of the Sixth International Conference in Knowledge Discovery and Data Mining.

* cited by examiner

SINGLE-PASS LOW-STORAGE ARBITRARY PROBABILISTIC LOCATION ESTIMATION FOR MASSIVE DATA SETS

PRIORITY STATEMENT

This application claims priority to U.S. application Ser. No. 60/283,003, filed on Apr. 11, 2001, herein incorporated by reference in its entirety.

BACKGROUND OF THE INVENTION

The present invention relates to a method and system for estimating an arbitrary probabilistic location for an unknown distribution using a series of computations based upon a small fraction of the original data set. For univariate densities, a quantile is an example of a probabilistic location.

The problem of estimating an arbitrary probabilistic location for an unknown distribution is commonly studied, given its relevance to numerous industries and applications. Being able to determine or estimate an arbitrary probabilistic location is useful because probabilistic locations can be used to efficiently summarize a distribution. Often, probabilistic locations are needed for the tails of a distribution (i.e. parts of the distribution that are far away from the mode(s) of the distribution). For example, in a univariate case, where minimum or maximum performance standards need to be monitored, the probabilistic location is often near the extreme ends of the distribution.

One of many areas where estimating probabilistic locations is useful is in database management systems. In database management systems, a query of a database can return a number of results. Probabilistic location estimation is useful as it provides an estimation of the number of results of a particular query. Given an accurate probabilistic location estimate, the amount of time taken for the query can be reduced by structuring the query appropriately to reduce the number of results. See e.g. U.S. Pat. No. 5,664,171 and U.S. Pat. No. 5,864,841, both to Agrawal et al. Another area where monitoring probabilistic locations is useful is in monitoring data flowing down a channel, for example data packets flowing through a network.

Generally, problems with prior art methods of probabilistic location estimation have included the size of the required data set (and corresponding amount of memory required), the lack of accuracy of estimates (particularly with respect to the extreme ends), and the computational efficiency of the method.

Several methods for estimating quantiles currently exist, all of which have problems. These problems include the impracticality of estimating extreme quantiles as well as the inability to be easily extended to arbitrary quantiles without ignoring part of the data to get a desired sample size, and restriction on the size of data sets. Many methods focus primarily on estimating the median of the distribution, and only the Stochastic Approximation ("S.A.") method is easily extended to estimate an arbitrary quantile. The main drawbacks of the S.A. methods are that its accuracy depends on an initial sample and it allows for estimates which are outside the range of possible values. Thus, the S. A. also performs poorly when estimating extreme quantiles.

Other methods for estimating quantiles exist. For example the method proposed in U.S. Pat. No. 6,343,288 and U.S. Pat. No. 6,108,658, both to Lindsay et al. Lindsay et al. disclose propose a method of estimating a quantile that requires only a single pass over the data set and does not require knowledge of the size of the data set. Despite these advantages, the Lindsay et al. methodology still requires significant processing and significant memory requirements.

Quantile estimation for an unknown distribution is a commonly studied problem. Pfanzagl (1974) showed that when nothing is known about a distribution of interest, the sample quantile has the minimum asymptotic variance among translation invariant estimators of the population quantile. While it may be desirable, using the sample quantile as an estimate of the population quantile becomes cumbersome and in many cases impractical to obtain, both in terms of storage space and computation time, when the size of the data set becomes large. In this specification we introduce a single-pass, low-storage method of estimating an arbitrary quantile, based on a sequential scoring algorithm that combines estimated ranks and assigned weights, where the weights represent, in some sense, the information associated with each estimated rank.

Massive datasets are becoming more and more common in modern society. They arise from sources as diverse as large call centers, internet traffic data, sales transactional records, or satellite feeds. Thus there is a clear need to be able to process the data accurately and efficiently so that current analyses may be performed before becoming inundated by a continually growing store of data.

Applications of the present invention include, but are not limited to, query optimization for large databases and network routing problems. Manku, Rajagopalan, and Lindsay (1998) note that it is common in the database field to keep summaries of the variables in the form of equi-depth histograms. However, creating and maintaining these histograms can be quite costly. Another application of the present invention is in the area of network routing. Network routing decisions are improved by having more accurate summaries of the distributions of the historical traffic data, in particular of the tails of these distributions such as is provided by the present invention. A further application, as noted in Dunn (1991), is in the computation through simulation of critical values and percentile points of new statistics whose distributions are unknown. A further application is in the area of MCMC estimation where simulations routinely generate massive amounts of data. The present invention contemplates these and other applications.

We start our discussion by putting forward notation and definitions that will be used throughout the specificationpaper. Let $X_1, \ldots, X_n$ be a sample from a distribution F, where we assume F is continuous so that all observations are unique with probability 1. Let the order statistics $X_{(1)} < \ldots < X_{(n)}$ be the observations arranged in ascending order. The $p^{th}$ population quantile of a distribution F is defined as $$\xi_{np} = F^{-1}(p) = \inf\{x : F(x) \geq p\},$$

and the $p^{th}$ sample quantile as $\xi_p = X_{(k)}$, where $k = \lceil np \rceil$ is the smallest integer greater than or equal to np, for $0 < p < 1$. Hence a sample quantile can be attained by simply sorting the data and taking the appropriate order statistic. However, as the size of the dataset becomes large, computation and storage burdens make this method infeasible.

Hurley and Modarres (1995) offer a nice survey of current methods for estimating quantiles. Most of the methods reviewed in this survey focus on estimating the median of a distribution, and in practice only one method, the Stochastic Approximation (S.A.) method introduced in Tierney (1983), is easily extended to estimate an arbitrary quantile. In addition to reviewing current methods, Hurley and Modarres (1995) introduce a histogram based method for estimating quantiles. Their proposed method has many attractive qualities, in particular for estimation of the median. However, for estimation of quantiles other than the median their method has a non-zero probability of having to be repeated, and hence requiring more than one pass through the data set, in order to obtain an appropriate estimate of the quantile. Extending their method so that it can be used to estimate extreme quantiles (quantiles with values of p close to 0 or 1), would result in an increased probability of requiring more than one pass through the data set, making it impractical for estimating extreme quantiles.

Pearl (1981) proposed using a minimax tree to estimate an arbitrary quantile. While this method is easy to implement and utilizes very little storage space, it has the drawback that it will only work for sample sizes that can be specified in terms of the three parameters which describe the tree. As a result this method cannot easily be extended to arbitrary quantiles without ignoring part of the data in order to get a desired sample size. Rousseeuw and Bassett (1990) proposed the remedian method of quantile estimation. As with the minimax tree method, there are restrictions on the size of data sets that can be analyzed using this method. The remedian method can be extended to other quantiles (see Chao and Lin (1993)), however this extension is not easily accomplished in practice.

Alternatively, the S.A. method proposed by Tierney (1983) is quite accurate, straightforward to implement for arbitrary sized datasets, and easily extensible to estimate arbitrary quantiles. The main drawbacks of the S.A. method are that its accuracy depends on an initial sample and it allows for estimates which are outside of the range of possible values. Because the accuracy depends on getting an initial sample that has a quantile that is close to the sample quantile of the entire data set, the S.A. performs poorly when estimating extreme quantiles. This is a weakness that can only be overcome by increasing the size of the initial sample which can lead to the same challenges associated with the sample quantile. With regards to the bounds of the S.A. estimator, if one were estimating a left tail quantile for data generated by a $X_1^2$ distribution, there is nothing to prevent this estimator from returning a negative value for an estimate, since the method doesn't return an actual element of the data set.

We note here that all of the methods under consideration here use a small fixed amount of storage. We will not be considering at this time methods that use a non-fixed amount of storage. An example of a method in this category is given by Dunn (1991). All of the existing methods considered here perform very accurately and efficiently for median estimation. Some, such as the S.A. method and histogram based method, are well suited to handle datasets of any size whereas others are better suited to situations where the sample size is large but static. Further, Tierney's S.A. method is easily extensible to estimate arbitrary quantiles although for tail quantiles the variability increases as one moves further out into the tails. Although these methods are in general very good, we feel that there is room for improvement in the area of tail quantile estimation in general and in particular with regard to the variability of the estimators relative to that of the sample quantile.

Therefore it is a primary object, feature, or advantage of the present invention to improve upon the state of the art.

Another object, feature, or advantage of the present invention is to provide a method and system for estimating a probabilistic location.

A further object, feature, or advantage of the present invention is to provide a method and system for estimating a probabilistic location that estimates accurately.

A still further object, feature, or advantage of the present invention is to provide a method and system for estimating a probabilistic location that is efficient.

Another object, feature, or advantage of the present invention is to provide a method and system for estimating a probabilistic location that does not require knowledge of the size of the data set.

Yet another object, feature, or advantage of the present invention is to provide a method and system for estimating a probabilistic location that requires only a small amount of storage.

A further object, feature, or advantage of the present invention is to provide a method and system for estimating a probabilistic location that is capable of use with massive data sets.

These and other objects, features, and advantages of the present invention will become apparent from the specification and claims that follow.

SUMMARY OF THE INVENTION

According to another aspect of the present invention, a method for providing an estimate of a summary of a data set generated by an unknown distribution is disclosed. The method includes selecting a subset of data points from the data set, applying a scoring rule to each data point of the subset of data points based on an estimated relative location and an assigned weight for each data point to provide a score for each data point, selectively retaining data points to track based on the score for each data point, and determining an estimate of the summary of the data set based on the retained data points.

According to another aspect of the present invention, the present invention keeps track of a small fraction of the original data set and uses a scoring rule based on an estimated location and an assigned weight for each data point, to determine which data points to track and which data points to ignore. The present invention provides a sequential method of estimating an arbitrary probabilistic location (e.g. a quantile for a univariate density and an equal probability manifold for a multivariate density) for an unknown distribution using a series of computations based upon a small fraction of the original data set. The accuracy of the method is dependent upon m, the size of the array of points being tracked. The larger the array size, the more closely it approximates the performance of an estimator based on the same (e.g. sample quantile).

According to another aspect of the present invention, the present invention performs quantile estimates. A number of data points are sorted, an estimated relative location is assigned to each data point, and a weight is set for each data point. The steps according to this aspect of the present invention include:

(a) Sort the first m data points. Set the estimated relative location (e.g. rank) for each data point equal to the actual relative location (e.g. rank) of the initial sample and set the weight for each data point to the integer to 1.

(b) Determine the relative location of the next point in the data set with regards to the m data points that are being tracked, and increment the estimated relative locations (e.g. ranks) of the points that are as least as far away from the global reference point appropriately (e.g. add one to the estimate ranks that are greater than the new point).

(c) Calculate an estimated relative location (e.g. rank).

(d) Assign a weight to the new point.

(e) Assign a score to all of the points in the array and to the new point.

(f) If the maximum score of the points being tracked is larger than the score for the new point, remove the point with the largest score from the tracking list and insert the new point, along with its estimated relative location (e.g. rank) and weight, into the tracking list.

Other aspects of the present invention include computer systems. The present invention includes a computer system for estimating a summary of a data set generated by an unknown distribution. The computer system includes a processor for processing data, a data storage component operatively connected to the processor for storing data, an input operatively connected to the processor for receiving data points from the data set, and the processor being adapted to receive data points from the data set based on an estimated relative location and an assigned weight for each data point, retain data points to track based on the score for each data point, and determine an estimate of the summary of the data set based on the retained data points. The present invention can be used for database query optimizations, network routing optimizations, and numerous other applications.

DETAILED DESCRIPTION OF A PREFERRED EMBODIMENT

The proposed method keeps track of a small fraction of the original data set and uses a scoring rule based on an estimated rank and an assigned weight for each data point to determine which data points to track and which data points to ignore. The assigned weights can be viewed in two different ways. From one perspective, each weight can be seen as a measurement of the amount of information associated with a particular estimated rank. From another perspective, each weight can be viewed as an estimate of the standard deviation associated with a particular estimated rank. The second perspective provided the inspiration for the scoring rule used in the algorithm.

Figure 1:
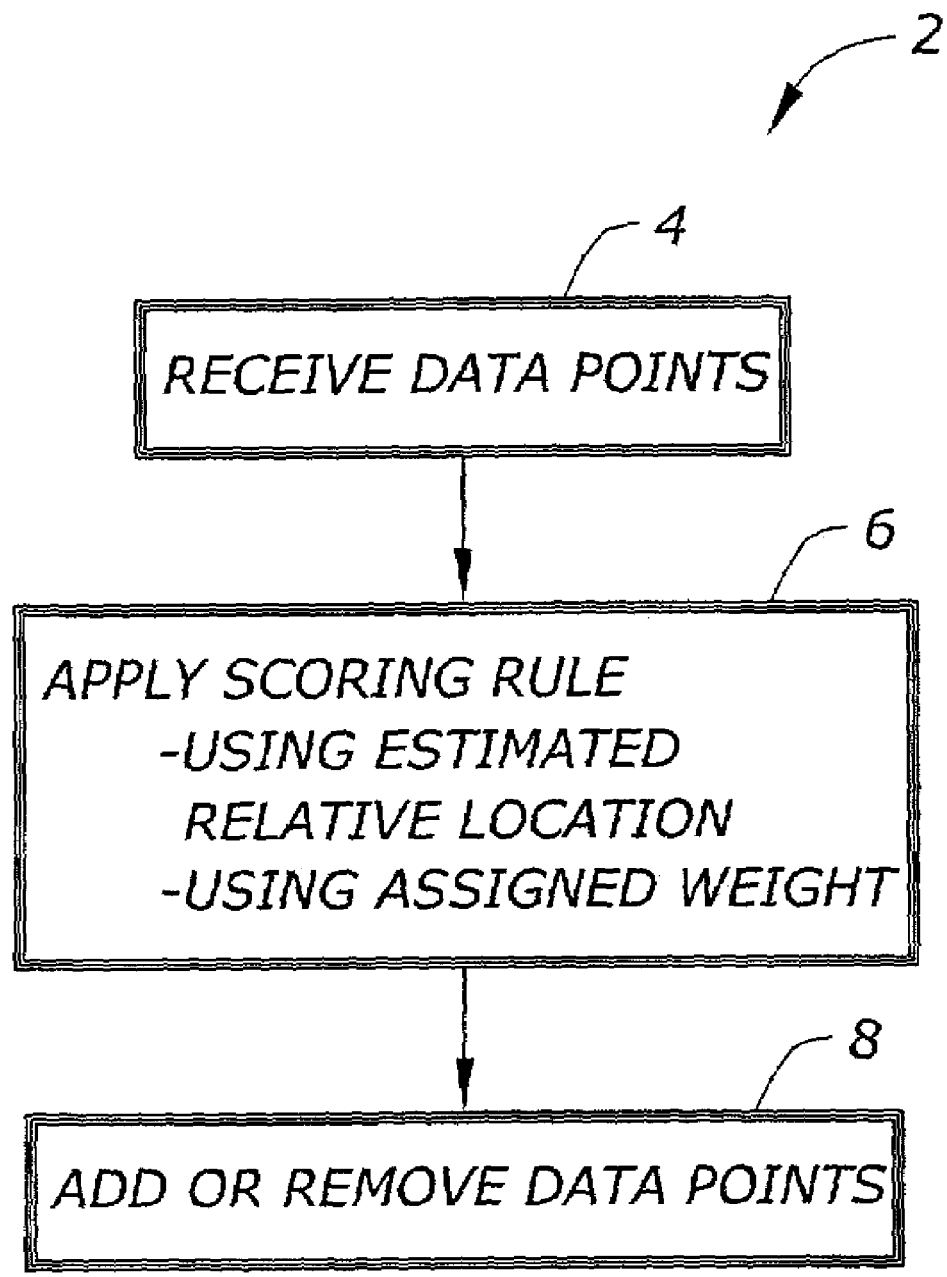
FIG. 1 is a flow diagram showing one embodiment of the present invention.

FIG. 1 provides an overview of the methodology according to one embodiment of the present invention. In FIG. 1, a method 2 is shown. The first step is to receive data points 4. The data points received are a subset of the massive data set for which a probabilistic location is to be estimated. Once the data points are received, the next step is to apply a scoring rule 6. The step of applying a scoring rule 6 is used to determine which data points to add or remove. In other words, the step of applying a scoring rule is used to determine which data points to track and which data points to ignore. After applying step 6, in step 8, data points are added or removed. The steps shown in FIG. 1 can be repeated. For example, when the data points are received through a data stream, new points are received, the scoring rule is applied, and data points to be considered are added and/or removed.

The scoring applies to each data point and can be based on an estimated relative location and assigned weight for each data point. The estimated relative location for each data point can be a function of the previous and current relation location and weights for each of the data points. The present invention further contemplates that different methods can be used to determine a point's relative location. For example, a linear interpolation method can be used to determine the point's relative location, or when the point is at a boundary, a nonlinear interpolation method can be used to determine the point's relative location.

Based on the scoring, data points are retained or discarded. For example, data points having the smallest scores can be retained while data points having the largest scores can be discarded. The present invention contemplates variations in the manner in which data points are scored.

The method shown in FIG. 1 provides an estimate of a summary of a data set generated by an unknown distribution. The summary of the data set can be a cumulative density function, a probability density function, a parametric summary, a semi-parametric summary, or a non-parametric summary.

Figure 2:
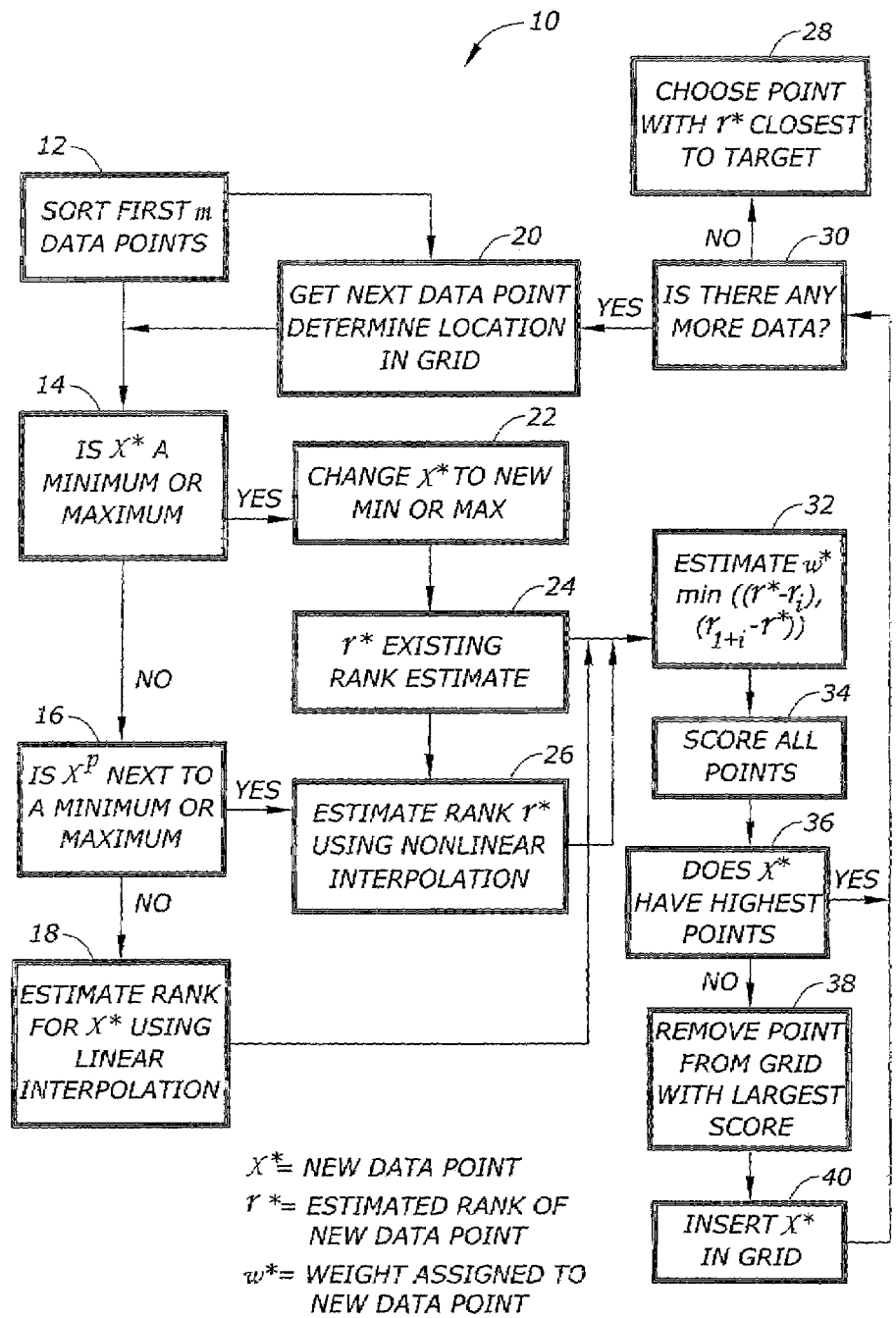
FIG. 2 is a flow diagram showing one embodiment of the present invention for a univariate case.

Another embodiment of the present invention is shown in FIG. 2. FIG. 2 provides a methodology 10 for a quantile estimation algorithm according to the present invention. According to FIG. 2, in step 12, the first m data points are sorted. The present invention contemplates that the data points can be either partially or fully sorted. For each of these data points, set an estimated rank, $r_i$, for each data point, $x_i$, equal to the actual rank of the initial sample (i.e. $r_i=i$). Set the weight, $w_i$, for each data point to 1 (i.e. $w_i=1$). Then, in step 20, receive a new data point, $x_*$.

In steps 14, 16, and 18, determine the location of the next point in the data set, $x_*$, with respect to the m data points that are being tracked, and increment the ranks of the points that are greater than the new point, i.e. if $x_i > x_*$, then $r_i = r_i + 1$.

Based on the relative location of $x_*$, calculate an estimated rank for the new point as shown in steps 22, 24, and 26. In step 32, a weight is assigned to the new point, let $$w_* = \min(r_{i+1} - r_* - r_i),$$

where $x_i < x_* < x_{i+1}$

In step 34, assign a score to all of the points in the array and to the new point, $$s_. = \left| \frac{r_. - \text{target}}{w_.} \right|,$$

where target=n'p, n' is the total number of data points observed so far and p is the proportion associated with the $p^{th}$ population quantile.

Next, the maximum score of the points being tracked and the score for the new point is compared in step 36. If the maximum score of the points being tracked is larger than the score for the new point, remove the point with the largest score from the tracking list and insert the new point, along with its estimated rank and weight, into the tracking list or grid in step 40.

The present invention contemplates that it may be desirable to discard other data points as well. For example, wherein some or all data points in the subset have a value equal to the value of one of the m data points already being tracked, these data points can be used to calculate the estimated rank and assigned weight for the m data points being tracked and can then be discarded. One manner of discarding these data points is by assigning a score of minus infinity to said data points so that these data points can later be discarded based on the score.

Next, repeat the process until a determination is made at step 30 that there are no more data points. In step 28, the final estimate is taken to be the tracked point in the final array with the estimated rank closest to the theoretical target rank for the given value of p and the given sample size.

The methodology shown in FIG. 2 is also summarized as follows:

A. Sort the first m data points. Set the estimated rank, $r_i$, for each data point, $x_i$, equal to the actual rank of the initial sample (i.e. $r_i=i$). Set the weight, $w_i$, for each data point to 1 (i.e. $w_i=1$).

B. Determine the location of the next point in the data set, $x_*$, with respect to the m data points that are being tracked, and increment the ranks of the points that are greater than the new point, i.e. if $x_i > x_*$, then $r_i = r_i + 1$.

C. Calculate an estimated rank for the new point; see detailed discussion for appropriate formula.

D. Assign a weight to the new point; let $$w_* = \min(r_{i+1} - r_*, r_* - r_i),$$

where $x_i < x_* < x_{i+1}$

E. Assign a score to all of the points in the array and to the new point, $$s_\cdot = \left| \frac{r_\cdot - \text{target}}{w_\cdot} \right|,$$

where target=n'p, n' is the total number of data points observed so far and p is the proportion associated with the $p^{th}$ population quantile.

F. If the maximum score of the points being tracked is larger than the score for the new point, remove the point with the largest score from the tracking list and insert the new point, along with its estimated rank and weight, into the tracking list.

G. Repeat steps B through F until all elements of the data set have been seen.

H. The final estimate is taken to be the tracked point in the final array with the estimated rank closest to the theoretical target rank for the given value of p and the given sample size.

The proposed method begins by sorting the first m points from the data set and assigning an estimated rank to each of these points. The estimated rank is a measure of where each point falls in relation to the other points previously observed. The weight associated with each observation is a measure of the amount of information associated with each estimated rank.

The estimated rank, which is assigned in step C above and steps 18, 24, and 26 of FIG. 2, depends on the location of the new point with respect to the points that are being tracked. Following are the formulae used to calculate the estimated rank for a new data point.

If the new point is a new maximum, $x_* > x_m$, the new point becomes the new maximum and the old maximum becomes the new point. Let $r_* = r_m$ and then let $r_m = r_m + 1$.

If the new point is a new minimum, $x_* < x_i$, the new point becomes the new minimum and the old minimum becomes the new point. Let $r_* = 2$ and then let $r_1 = 1$.

If the new point is just less than the maximum, $x_{m-1} < x_* < x_m$, then $$r_* = r_{m-1} + \frac{r_m r_{m-1}}{1-\delta}(1 - e^{-\lambda(x_* - x_{m-1})})$$

where $$\delta = e^{-\lambda(x_m - x_{m-1})}, \lambda = -\frac{\log(1 - q_2(1-\delta))}{q_1(x_m - x_{m-1})},$$

and $q_1$ and $q_2$ are set by the researcher (as will be discussed below).

*If the new point is just greater than the minimum, $x_1 < x_* < x_2$ then $$r_* = r_2 + \frac{r_1 - r_2}{1-\delta}(1 - e^{-\lambda(x_2 - x_*)}),$$

where $$\delta = e^{-\lambda(x_2 - x_1)}, \lambda = -\frac{\log(1 - q_2(1-\delta))}{q_1(x_2 - x_1)}$$

and $q_1$ and $q_2$ are, again, set by the researcher.

*If the new point falls any where else, $x_2 < x_* < x_{m-1}$, then $$r_* = r_i + (r_{i+1} - r_i)\frac{x_* - x_i}{x_{i+1} - x_i}$$

where $x_i < x_* < x_{i+1}$

To illustrate these ideas, note in step 26 of FIG. 2 that if a new point falls between the current minimum and the second smallest point in the tracking array or between the current maximum and the second largest point in the tracking array (i.e. between $x_1$ and $x_2$ or between $x_{m-1}$ and $x_m$) then we use the non-linear interpolation method for obtaining the estimated rank of this new point. If it falls between two other points in the tracking array (i.e. between $x_i$ and $x_{i+1}$, for $2 \leq i \leq m-2$ then we apply the linear interpolation method. If the new point represents a new maximum or minimum, we simply switch the old maximum or minimum with the new point and assign estimated ranks accordingly. If the new point is between the minimum and the second smallest point in the list that is being tracked or between the maximum and the second largest point, we use a non-linear interpolation to estimate the rank. In all other cases we use a simple linear interpolation to estimate the rank of the new point. We found that as the algorithm progresses through a data set, the distance between the maximum or minimum element of the tracked list and the next point in the tracked list tends to become very large. As a result, the values associated with the points being tracked tend to contain reasonably good information about the rank for points close to the quantile that is being estimated, but these values offer very little information about the rank of points that are not close to this quantile. The non-linear functions are designed in such a way that the estimated ranks quickly go to the rank associated with the maximum or minimum element as the new point moves towards either of these elements.

Breiman, Gins, and Stone (1979) propose taking the maximum likelihood estimator of the tail of the sample and then fitting an exponential curve with this estimated parameter value to predict unobserved tail quantiles. Ott (1995) discusses various methods for fitting a two-parameter exponential curve to the tail of the data. In our approach, we use fixed parameters for our exponential curves and force them to go through two points: the minimum (or maximum), the second smallest (or second largest) point in the tracking array. The shape of the exponential curves is determined by the parameters $q_1$ and $q_2$. These non-linear functions serve as safeguards against heavy-tailed data. If there is no heavy tailed data, the curves have little or no effect.

The parameters $q_1$ and $q_2$ determine how quickly the estimated rank goes to the rank associated with the maximum or minimum. To illustrate, for the maximum, $q_1$ and $q_2$ are set so that and $$q_1 = \frac{x_* - x_{m-1}}{x_m - x_{m-1}}$$

and $$q_2 = \frac{r_* - r_{m-1}}{r_m - r_{m-1}}.$$

In practice we set $q_1=0.1$ and $q_2=0.9$. The reasons for these choices are purely heuristic. Through experimentation, we have found these values to work best for the wide range of distributions considered. The result of choosing these levels of $q_1$ and $q_2$ is that if the new point were exactly equal to the next largest value being tracked plus 10% of the distance between the largest value and the next largest value, i.e. $x_*=x_{m-1}+q_1(x_m x_{m-1})$, then the estimated rank for this new point is equal to the estimated rank associated with the next largest value plus 90% of the distance between the estimated ranks associated with the largest value and the next largest value, i.e. $r_*=r_{m-1}+q_2(r_m-r_{m-1})$.

While there are a wide range of non-linear functions which could be used, we found that (1) and (2), improve the performance of the algorithm in almost all cases. The only time that the non-linear interpolation hurts the performance of the algorithm is in cases where the estimated quantile is close to the maximum or minimum of a probability distribution. For example, the quantile associated with p=0.01 when the density can not have values less than 0. In these cases we found that it was better to replace the non-linear interpolation with a linear interpolation.

The score, which is calculated in step 34 of FIG. 2, can be thought of as a 'z-score' for the target rank n'p. The score for each point could be viewed as the 'probability' that the target rank came from a distribution with a mean equal to the estimated rank and a standard deviation equal to the assigned weight. The larger the score, the less likely it is that the target rank is similar to the estimated rank, and the less likely that the associated point is similar to the target sample quantile.

If a new point is 'close' to one of the points being tracked, then the estimated rank of the new point will be 'close' to the estimated rank of that point. When a new point is 'close' to a tracked point, the associated weight will be 'small', reflecting the idea that there is little new information associated with the rank estimate of that new point. As a result, the new point's score will tend to be 'large' and more likely to be thrown out. This makes intuitive sense since a point that is 'close' to a current point will not be giving us much new information. However, if a new point is 'close' to the middle of the two adjacent points that are being tracked, then the estimated rank will tend not to be 'close' to the estimated rank of one of the tracked points. In this case the associated weight tends to be 'large', the associated score tends to be 'small' and the new point is more likely to be kept. Again this makes sense because a point that falls farther away from the current points is giving us new information which may tend to be more useful.

Figure 3:
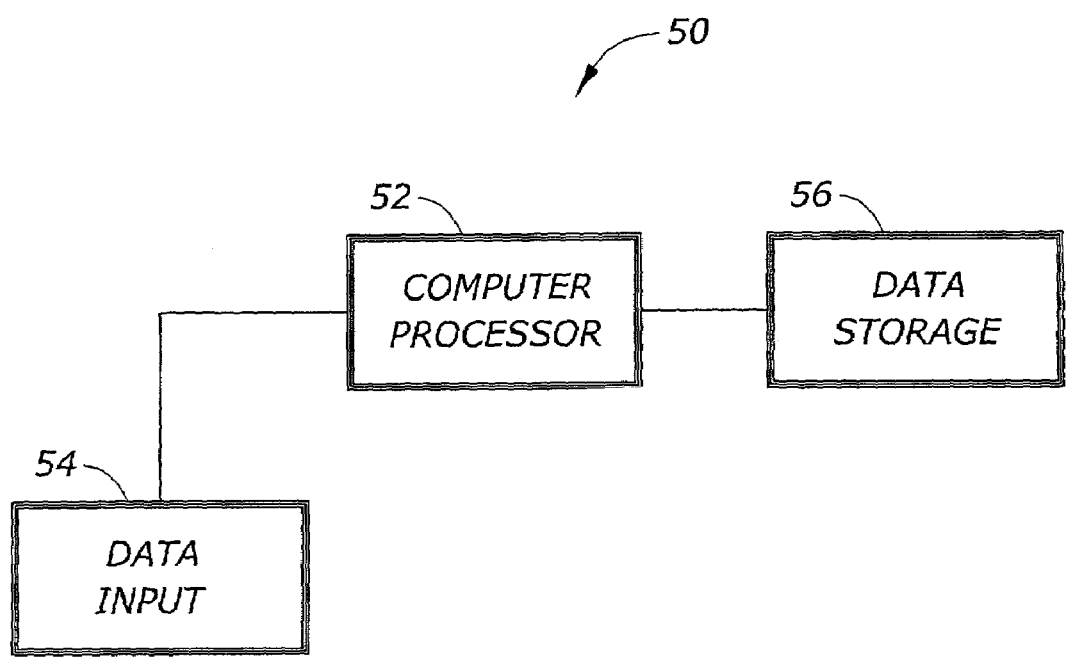
FIG. 3 is a block diagram showing a system according to one embodiment of the present invention.

FIG. 3 provides a block diagram for one embodiment of the present invention. In FIG. 3, a system 50 is shown. The system includes a processor 52. The processor 52 is operatively connected to a data input 54 and a data storage 56. The processor 52 receives data points from the data input 54. The present invention contemplates any number of sources for the data input 54. For example, the data input 54 can come from a memory or other data storage, including a database. Alternatively, the data input 54 can came from a stream of data, including, but not limited to a stream of data on a network. The present invention contemplates that the data storage 56 can be of any number of types of data storage. The present invention contemplates that the amount of storage needed to store each data point and the number of data points that are stored at any one time are flexible. Therefore, the present invention contemplates that various amounts and types of data storage can be used depending upon the particular application, the size of the data points, and the number of data points. One advantage of the present invention, however, is that only a small number of data points are required for accurate estimates.

The present invention further provides that the methodology is extendable such that multiple summaries of estimates of the data set can be determined at the same time. The storage required and the computational time required is scalable such that it requires less than a one-to-one increase in computational time and storage requirements for each additional summary of the data set. For example, there is overlap in the data points that would be retained when multiple summaries are sought.

Figure 4:
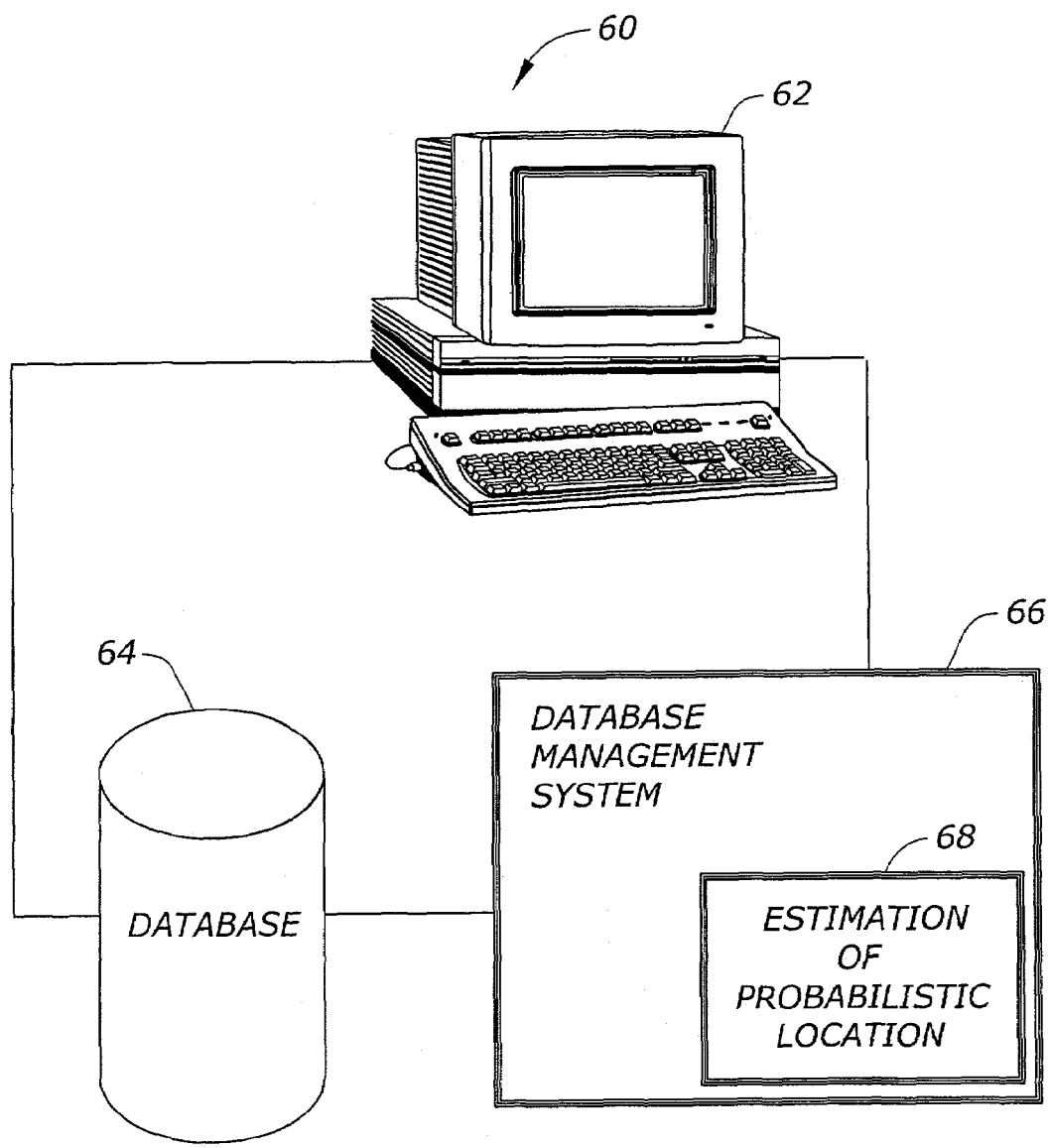
FIG. 4 is a block diagram showing a system according to one embodiment of the present invention.

FIG. 4 provides a block diagram of one embodiment according to the present invention. In FIG. 4, a system 60 is shown. The system 60 includes a computer 62 that is operatively connected to a database 64 and a database management system 66. The database management system 66 includes a component 68 for estimation of probabilistic location according to the present invention. The estimation of probabilistic location component 68 can be implemented in any number of ways and can be used by the database management system to improve database management. One way in which the component 68 is used is in order to optimize queries to be performed on the database. Using the component 68 for statistical estimates of the database 64 allows the database management system 66 to structure queries in an efficient manner, thus increasing the speed of returning query results, reducing the number of database records that need to be examined, and/or otherwise improving the efficiencies of database access.

We have also tested the methodology according to one embodiment of the present invention in four separate simulation studies. The first two studies (tables 1 and 2) focus on assessing the performance of the proposed method as compared with the methods reviewed in Hurley and Modarres (1995), with regard to estimation of the median. The third study (tables 3 and 4) focus on the performance of the proposed method compared with the S.A. method with regard to estimating a collection of different quantiles. The fourth study (table 5) focused on studying the performance of the proposed method as the number of elements being tracked is increased. All simulation studies presented here were implemented using the C programming language. This choice was made mainly for reasons of computational efficiency since the sizes of the datasets generated were so large. The present invention is not limited to any specific implementation. For example, the methodology of the present invention can be programmed in any number of different languages.

The first simulation study (table 1) is a reproduction of the study presented in Hurley and Modarres (1995) with the method of the embodiment of the present invention shown in FIG. 2 included. As in their paper, we use samples of size 50,625 with 1,000 replications for the standard normal, the standard Cauchy, the chi-square with 1 degree of freedom, and a mixture with 90% of the data coming from a standard normal and 10% of the data coming from a normal with mean 0 and variance 9. For the next three tables (tables 2–4), we used data drawn from the same distributions except that the mixture had 90% of the observations drawn from standard normal and 10% of the observations drawn from a normal with mean 10 and variance 9. In the first two studies we used five different methods to estimate the median: S.A., remedian, histogram, minimax and the proposed method. In order to accommodate the restrictions on the size of the data set that can be used for both the minimax method and the remedian method we generated data sets with 3,748,096 elements for the second study. (It should be noted that the with this size of a data set, the minimax method is actually estimating the $50.44^{th}$ percentile, not exactly the median.) In the third study we used the S.A. method and the proposed method to estimate the quantiles for p=0.001, 0.01, 0.05, 0.10, 0.25, 0.75, 0.90, 0.95, 0.99, and 0.999 and we generated data sets with 10,000,000 observations. In studies 2, 3, and 4 we used 100 replications. For the fourth study we used data that was drawn from the standard normal and standard Cauchy densities for the purpose of examining the effect of increasing the value of m.

For each study and each quantity being estimated we calculated the average estimate, the mean square error (MSE) of each estimation method with regards to the population quantile and the MSE of the sample quantile with regards to the population quantile. The efficiency of each algorithm was assessed by calculating the ratio of these two MSE estimates. Our motivation for calculating this MSE ratio is to create a measure of how each estimator's variation compares to that of the sample quantile. We also present a measure called MSE* which we define to be the average squared deviation of the proposed estimate from the true sample quantile. This measure differs from the usual mean squared error in that we measure deviations from the sample quantile instead of the population quantile. Our motivation for including MSE* is that we want to see how closely an estimator's performance tracks that of the sample quantile.

In the first three studies, the proposed method only kept track of 100 data points at any one time, or m=100. As a result the total storage needed then was 300 memory locations; 100 for each of the arrays used in the algorithm. To make a fair comparison, we also allowed the S.A. and histogram methods to take initial samples of size 300.

Here we present the results of the two median comparison studies. Table 1 gives results of the recreation of the study done by Hurley and Modarres (1995). The results show similar results as given by Hurley and Modarres but with the inclusion of the methodology shown in FIG. 2. Our proposed method performs as well as or slightly better than all methods considered.

TABLE 1

Median Comparison - 50,625 observations m = 60

| Distribution | Normal | Cauchy | X | Mixture |
|---|---|---|---|---|
| True Median | 0.00000 | 0.00000 | 0.45494 | 0.00000 |
| Method | avg. est. mse ratio mse* | avg. est. mse ratio mse* | avg. est. mse ratio mse* | avg. est. mse ratio mse* |
| Histogram | 0.00104 1.020 5.8e − 05 | 0.00138 1.025 1.4e − 06 | 0.45580 1.031 7.6e − 07 | 0.00077 1.008 6.9e − 05 |
| Stochastic Approx. | 0.00024 1.007 5.7e − 05 | 0.00027 1.017 1.3e − 06 | 0.45497 1.008 2.1e − 07 | −0.00004 1.012 6.9e − 05 |
| Remedian | 0.00002 3.383 1.3e − 04 | −0.00054 3.351 1.2e − 04 | 0.45508 3.451 5.3e − 05 | −0.00052 3.733 1.6e − 04 |
| Minimax | −0.02252 79.730 2.5e − 03 | −0.02851 78.414 3.8e − 03 | 0.43690 148.459 1.6e − 03 | −0.02616 80.723 2.9e − 03 |
| Proposed Method | 0.00022 0.998 5.7e − 05 | 0.00035 0.995 1.2e − 07 | 0.45505 0.996 5.8e − 08 | −0.00010 0.997 6.9e − 05 | avg. est. = median estimates averaged over 1000 runs
mse ratio = MSE for given estimator/MSE for sample quantile
mse* = average squared deviation of a given estimate from sample quantile estimate We next consider a second median comparison study with a much larger sample size of 10,000,000 and with different parameter settings for the various methods. While all of the methods gave adequate averaged estimates of the median, there were very noticeable differences in the measures of variation (see Table 2). The minimax estimator consistently displayed the worst performance of all methods. However, this can be attributed to 2 facts. First, for the given parameter values, the estimator is actually estimating the $50.44^{th}$ percentile not exactly the median. Hence all estimates will have a slight positive bias. Secondly, the height of the minimax tree is quite small, which is theoretically known to impact the performance of the minimax method. The remedian estimator had MSE ratios of between 3 and 4. The MSE ratios for the histogram, S.A., and proposed methods were all very close to 1 for all of the distributions. The proposed method had a slight advantage in the MSE* measurement. Hence for median estimation, one could employ either of the histogram, S.A., or the methodology of the embodiment of FIG. 2 and achieve comparable performance results.

TABLE 2

Median Comparison - 3,748,096 observations with m = 100

| Distribution | Normal | Cauchy | X | Mixture |
|---|---|---|---|---|
| True Median | 0.00000 | 0.00000 | 0.45494 | 0.13959 |
| Method | avg. est. mse ratio mse* | Avg. est. mse ratio mse* | avg. est. mse ratio mse* | avg. est. mse ratio mse* |
| Histogram | 0.00002 1.003 3.6e − 09 | −0.00001 0.987 4.9e − 09 | 0.45493 1.003 2.3e − 09 | 0.13950 0.966 4.5e − 09 |
| Stochastic Approx. | −0.00003 1.004 5.5e − 10 | −0.00007 0.991 7.1e − 10 | 0.45489 1.001 3.8e − 10 | 0.13944 0.988 6.9e − 10 |

TABLE 2-continued

Median Comparison - 3,748,096 observations with m = 100

| Distribution | Normal | Cauchy | X | Mixture |
|---|---|---|---|---|
| Remedian | 0.00016 | 0.00007 | 0.45569 | 0.13952 |
| | 3.444 | 3.904 | 5.912 | 4.119 |
| | 1.1e − 06 | 1.9e − 06 | 1.4e − 06 | 1.3e − 06 |
| Minimax | 0.01346 | 0.01776 | 0.46250 | 0.15253 |
| | 821.465 | 1125.343 | 1683.415 | 895.516 |
| | 3.8e − 04 | 7.6e − 04 | 2.2e − 04 | 4.0e − 04 |
| Proposed | −0.00003 | −0.00007 | 0.45489 | 0.13944 |
| Method | 1.007 | 0.998 | 0.996 | 0.999 |
| | 1.6e − 10 | 1.9e − 10 | 1.4e − 10 | 2.7e − 10 | avg. est. = median estimates averaged over 100 runs
mse ratio = MSE for given estimator/MSE for sample quantile
mse* = average squared deviation of a given estimate from sample quantile estimate As mentioned earlier, here we only compared the S.A. method with the method of FIG. 2. Tables 3 and 4 give results regarding performance for estimating a wide range of quantiles for the four densities under study. The differences here are much more pronounced than in the median comparison. To emphasize this point, consider the results for the normal distribution with p=0.001. The MSE ratio of the S.A. estimator is 8415.2 whereas the MSE ratio of our method is only 0.993. Similar observations hold for the other quantiles and distributions considered.

Another interesting result is for p=0.001 for the chi-square density. The averaged estimates for the S.A. method is −0.000223 which is not within the range of values for the chi-square density. Also of note here is the extremely large MSE ratio for this example. Hence the S.A. method has potential problems when estimating values near the extreme tail of a density with a hard cut-off (as is the case here with the chi-square at zero).

TABLE 3

Arbitrary Quantile Comparison - 10,000,000 observations w m = 100

| | Normal | | | Cauchy | | |
|---|---|---|---|---|---|---|
| p | Method True | S.A. avg.est. mse ratio mse* | Proposed avg.est. mse ratio mse* | Method True | S.A. avg.est. mse ratio mse* | Proposed avg.est. mse ratio mse* |
| 0.001 | −3.0902 | −3.0733 | −3.0902 | −318.31 | −519.63 | −318.57 |
| | | 8415.2 | 0.993 | | 180928.7 | 1.031 |
| | | 7.6e − 02 | 2.2e − 08 | | 1.5e + 06 | 4.7e − 01 |
| 0.01 | −2.3264 | −2.3295 | −2.3262 | −31.821 | −44.110 | −31.808 |
| | | 72.86 | 1.001 | | 104023.9 | 1.008 |
| | | 7.4e − 05 | 1.8e − 09 | | 1.1 + 03 | 2.9e − 05 |
| 0.05 | −1.6449 | −1.6448 | −1.6448 | −6.3138 | −6.6253 | −6.3137 |
| | | 0.991 | 0.994 | | 10020.9 | 0.998 |
| | | 1.2e − 09 | 2.4e − 10 | | 7.4e − 01 | 4.7e − 08 |
| 0.10 | −1.2816 | −1.2816 | −1.2816 | −3.0777 | −3.0912 | −3.0777 |
| | | 1.005 | 0.995 | | 142.71 | 0.999 |
| | | 3.1e − 10 | 1.6e − 10 | | 1.2e − 03 | 3.2e − 09 |
| 0.25 | −0.6745 | −0.6744 | −0.6744 | −1.0000 | −1.0001 | −1.0001 |
| | | 1.007 | 0.997 | | 1.014 | 0.991 |
| | | 2.0e − 10 | 6.9e − 11 | | 2.2e − 09 | 2.0e − 10 |
| 0.75 | 0.6745 | 0.6745 | 0.6745 | 1.0000 | 1.0000 | 1.0000 |
| | | 1.000 | 0.996 | | 0.992 | 1.002 |
| | | 1.9e − 10 | 6.3e − 11 | | 2.3e − 09 | 1.8e − 10 |
| 0.90 | 1.2816 | 1.2815 | 1.2815 | 3.0777 | 3.0916 | 3.0779 |
| | | 0.995 | 1.002 | | 212.21 | 1.002 |
| | | 3.9e − 10 | 1.3e − 10 | | 2.4e − 03 | 2.7e − 09 |
| 0.95 | 1.6449 | 1.6448 | 1.6448 | 6.3138 | 6.5340 | 6.3154 |
| | | 0.999 | 1.006 | | 12337.7 | 0.992 |
| | | 1.2e − 09 | 2.6e − 10 | | 1.0e − 00 | 3.4e − 08 |
| 0.99 | 2.3264 | 2.3261 | 2.3264 | 31.821 | 34.211 | 31.839 |
| | | 11.56 | 0.996 | | 34137.4 | 0.997 |
| | | 1.1e − 05 | 5.0e − 09 | | 3.6e + 02 | 2.5e − 05 |
| 0.999 | 3.0902 | 2.9877 | 3.0894 | 318.31 | 1159.93 | 317.60 |
| | | 3179.5 | 1.088 | | 2009247.5 | 1.168 |
| | | 3.1e − 02 | 1.1e − 06 | | 2.2e + 07 | 2.8e + 00 | avg. est. = median estimates averaged over 100 runs
mse ratio = MSE for given estimator/MSE for sample quantile
mse* = average squared deviation of a given estimate from sample quantile estimate

TABLE 4

Arbitrary Quantile Comparison - 10,000,000 observations w m = 100

| | Chi-square | | | Mixture | | |
|---|---|---|---|---|---|---|
| p | Method True | S.A. avg.est. mse ratio mse* | Proposed avg.est. mse ratio mse* | Method True | S.A. avg.est. mse ratio mse* | Proposed avg.est. mse ratio mse* |
| 0.001 | 0.000002 | −0.000223 36375319.0 5.7e − 08 | 0.000002 0.967 4.3e − 17 | −3.0590 | −2.9732 7758.5 5.7e − 02 | −3.0589 1.003 2.2e − 08 |
| 0.01 | 0.00016 | 0.00016 1.060 2.7e − 13 | 0.00016 0.993 9.2e − 16 | −2.2867 | −2.2897 47.9 8.0e − 05 | −2.2867 1.011 1.6e − 09 |
| 0.05 | 0.00393 | 0.00393 0.997 3.6e − 13 | 0.00393 0.997 61e − 14 | −1.5933 | −1.5933 1.006 2.2e − 09 | −1.5933 1.002 2.1e − 10 |
| 0.10 | 0.01579 | 0.01579 1.007 1.1e − 12 | 0.01579 0.998 3.4e − 13 | −1.2207 | −1.2207 0.998 5.5e − 10 | −1.2207 0.996 1.1e − 10 |
| 0.25 | 0.10153 | 0.10151 1.005 1.1e − 11 | 0.10152 1.000 4.5e − 12 | −0.5895 | −0.5895 1.002 1.8e − 10 | −0.5895 0.998 5.9e − 11 |
| 0.75 | 1.3233 | 1.3233 1.014 8.8e − 10 | 1.3233 1.000 1.5e − 10 | 0.9668 | 0.9668 1.007 3.5e − 10 | 0.9668 0.994 1.1e − 10 |
| 0.90 | 2.7055 | 2.7055 0.991 3.9e − 08 | 2.7055 0.999 8.1e − 10 | 3.0509 | 4.0626 5492.9 2.8e − 00 | 3.0518 1.010 8.2e − 07 |
| 0.95 | 3.8415 | 3.8422 4.473 1.6e − 05 | 3.8415 0.996 2.7e − 09 | 10.000 | 9.977 1726.8 3.9e − 02 | 9.999 1.000 1.3e − 08 |
| 0.99 | 6.6349 | 6.5630 4237.4 1.0e − 01 | 6.6342 1.007 8.5e − 08 | 13.845 | 13.803 6093.2 1.7e − 01 | 13.844 1.011 1.2e − 07 |
| 0.999 | 10.828 | 10.115 15156.3 5.2e − 00 | 10.821 1.143 3.8e − 05 | 16.979 | 16.472 15490.9 1.9e − 00 | 16.976 1.119 1.5e − 05 | avg. est. = median estimates averaged over 100 runs
mse ratio = MSE for given estimator/MSE for sample quantile
mse* = average squared deviation of a given estimate from sample quantile estimate The poor tail performance of the S.A. method could be improved by taking a larger initial sample and thereby obtaining a more accurate starting value. For example, in the above example with p=0.001 for the normal density, if instead of an initial sample of size 300 we increase the size to 10,000, the MSE ratio decreases from 8415 to 564. Another example is for p=0.999 with the Cauchy density. If we again allow an initial sample of size 10,000 instead of 300 the MSE ratio goes from over 2,000,000 down to approximately 1099. These are both considerable improvements, but still not close to ratios of 1. One could conceivably continue to increase the size of the initial sample, however doing so would introduce a new storage burden.

The present invention further contemplates that the value of m, the size of the set of points being tracked can be varied. Table demonstrates the impact of varying the value of m, the size of the array of points being tracked. As can be seen in Table 5, the performance of the proposed estimator, as a function of the number of data points being tracked, appears to stabilize for m=60 or higher for the normal density and for m=80 or higher for the Cauchy density.

TABLE 5

Proposed method varying m for median estimation using 10,000,000 observations

Figure 5:
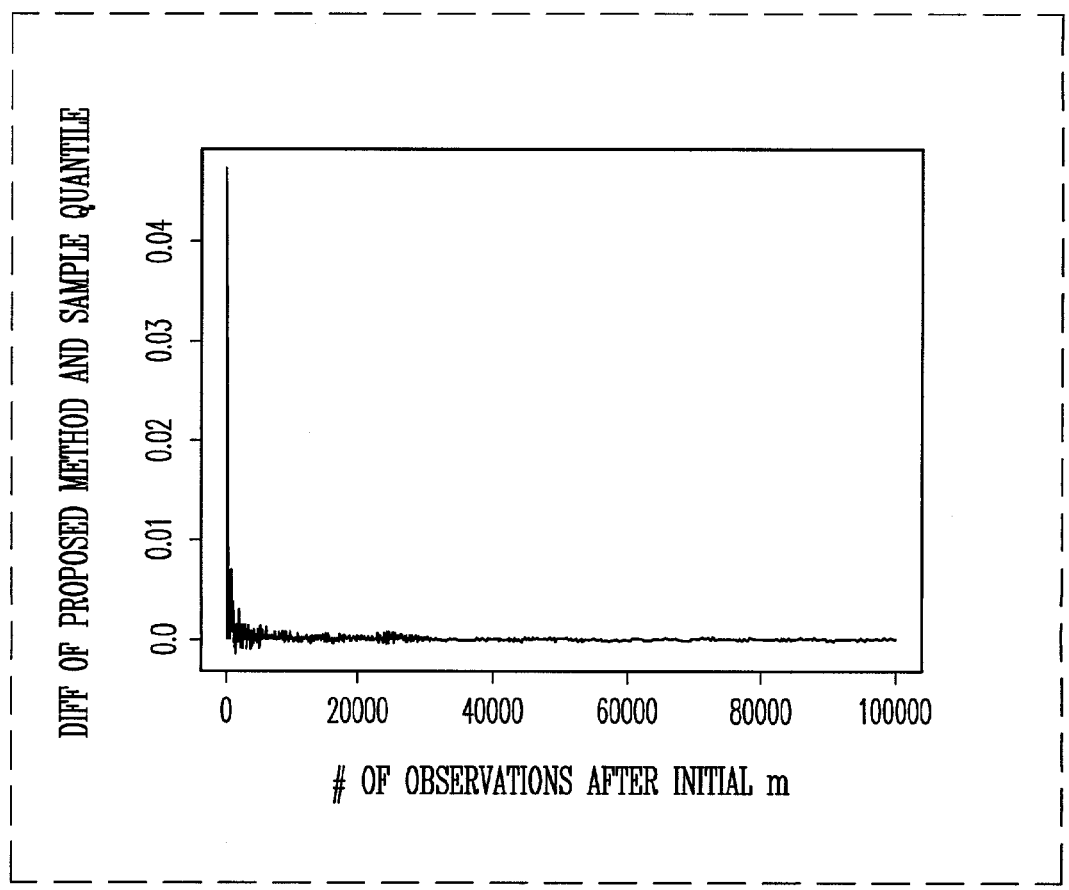
FIG. 5 is a sequential graph showing the difference between the sample median and the estimate of the median obtained from the method of one embodiment of the present invention for a sample drawn from the standard Cauchy distribution.

| m | Normal avg. est. mse ratio mse* | Cauchy avg. est. mse ratio mse* |
|---|---|---|
| 40 | 0.000029 1.003 2.2e − 10 | −0.001270 143.979 3.3e − 05 |
| 60 | 0.000023 0.993 5.5e − 11 | −0.000087 3.154 4.0e − 07 |
| 80 | 0.000023 0.997 4.8e − 11 | 0.000001 1.000 9.2e − 11 |
| 100 | 0.000024 0.997 3.1e − 11 | −0.000001 1.001 5.3e − 11 |
| 500 | 0.000024 1.000 4.7e − 12 | −0.000001 1.002 1.1e − 11 |
| 1000 | 0.000023 1.001 2.2e − 12 | −0.000001 1.002 4.0e − 12 | avg. est. = median estimates averaged over 100 runs
mse ratio = MSE for given estimator/MSE for sample quantile
mse* = average squared deviation of a given estimate from sample quantile estimate We have also provided theoretical considerations of the present invention. We approach the convergence issue by monitoring the distance between our estimator and the target sample quantile as new data points are observed (see FIG. 5 for an example of a plot of this difference for the median from a dataset drawn from the Cauchy density).

Intuitively this suggests that the proposed method should always be in some order statistic neighborhood of the true sample quantile at any given step. Experimentation has shown that for the median the proposed method is always within $\pm 3m+k$ order statistics of the true sample median at that point in time. Here k denotes the number of data points that have been observed after the first m. If the proposed estimator always remains within this range then the following lemma demonstrates that the estimator will converge to the target population quantile.

Lemma. Let $X_1, \ldots, X_n$ be a random sample from a continuous distribution function F and let $0<p<1$. Further assume that F is twice differentiable at $\epsilon_p = F^{-1}(p)$ and that $F'(\epsilon_p) = f(\epsilon_p) > 0$. Then $$\sqrt{n}(X_{(np+\sqrt[3]{n})} - X_{(np-\sqrt[3]{n})}) \to 0,$$

as $n \to \infty$

Proof. Without loss of generality, we can assume $np \pm \sqrt[3]{\sqrt{n}}$ are both integer valued indices. If they are not integer valued, we can apply the greatest integer function. Then by Bahadur's representation of the sample quantiles (see Bahadur 1966 and Serfling 1980) we have $$X_{(np\pm\sqrt[3]{n})} = \epsilon_p + \frac{p \pm n^{-2/3} - F_n(\epsilon_p)}{f(\epsilon_p)} + O\left((n^{-3/4}(\log n))^{3/4}\right),$$

with probability 1 as $n \to \infty$ Therefore we have $$X_{(np+\sqrt[3]{n})} - X_{(np-\sqrt[3]{n})} = \frac{2n^{-2/3}}{f(\epsilon_p)} + O\left((n^{-3/4}(\log n))^{3/4}\right),$$

and hence the result follows.

In all of our simulations the proposed estimator has stayed within $\pm \sqrt[3]{\sqrt{m+k}}$ order statistics of the true sample median and we conjecture that this result will hold when the proposed method is used for data that comes from an arbitrary continuous distribution.

The only estimators which are easily extended to accommodate tail quantile estimation are the sample quantile estimator, the S.A. estimator of Tierney (1983), and the estimator of the present invention. The sample quantile estimator is costly to employ when the size of the dataset becomes large, making it unattractive or infeasible for large datasets. The S.A. method's accuracy is dependent upon the size of the initial sample taken for the starting value. The larger the initial sample, the better the starting value and hence the more accurate the final estimate will be. The accuracy of the preferred embodiment of the present invention is dependent upon m, the size of the array of points being tracked. The larger the array size, the more closely it approximates the performance of the sample quantile estimator. However, based upon our experimental results, setting m=100 is in general a reasonable choice.

The method of the present invention has at least three advantages. First, our method will return an actual observation as an estimate, whereas there is nothing to prevent the S.A. method from returning an estimate that is outside the range of possible values for the distribution generating the data. The histogram method does not suffer from this drawback. Second, the method of the present invention performs better than the S.A. and histogram methods with regards to approximating the sample quantile. It appears that the only way to overcome that difference in performance is to increase the size of the initial sample for these other methods. A third advantage has to do with using both methods to estimate a collection of quantiles simultaneously. The S.A. and histogram methods would probably scale in a linear fashion with regards to computational time and storage requirements, i.e. estimating n quantiles would take n times as long as estimating one quantile. It should be apparent to one skilled in the art having the benefit of this disclosure that the method of the present invention can be extended in such a way that it requires less than a one-to-one increase in computational time and storage requirements as not every step in the method needs to be repeated for each quantile.

[1] Agrawal et al., System and Method For Query Optimization Using Quantile Values of a Large Unordered Data Set, U.S. Pat. No. 5,664,171.

[2] Agrawal et al., System and Method For Query Optimization Using Quantile Values of a Large Unordered Data Set, U.S. Pat. No. 5,864,841.

[3] Lindsay et al., Single Pass Space Efficient System and Method for Generating an Approximate Quantile in a Data Set Having an Unknown Size, U.S. Pat. No. 6,343,288.

[4] Lindsay et al., Single Pass Space Efficient System and Method for Generating Approximate Quantiles Satisfying an Apriori User-Defined Approximation Error, U.S. Pat. No. 6,108,658.

[5] Bahadur, R. R. 1966. A Note on Quantiles in Large Samples, *Annals of Mathematical Statistics*, 37, 577–580.

[6] Breiman, L., Gins, J., and Stone, C. 1979. *New Methods for Estimating Tail Probabilities and Extreme Value Distributions*, Technology Service Corp. Santa Monica, Calif., TSC-PD-A2261.

[7] Chao, M. T. and Lin, G. D. 1993. The Asympotic Distribution of the Remedians, *Journal of Statistical Planning and Inference*, 37, 1–11.

[8] Dunn, C. L. 1991. Precise Simulated Percentiles in a Pinch, *The American Statistician*, 45(3), 207–211.

[9] Hurley, C. and Modarres, R. 1995. Low-Storage Quantile Estimation, *Computational Statistics*, 10(4), 311–325.

[10] Manku, G. S., Rajagopalan, S., and Lindsay, B. G. 1998. Approximate Medians and other Quantiles in One Pass and with Limited Memory, *Proc. ACM SIGMOD International Conf. on Management of Data*, June, 426–435.

[11] Pearl, J. 1981. A Space-Efficient On-Line Method of Computing Quantile Estimates, *Journal of Algorithms*, 2, 164–177.

[12] Ott, W. R. 1995. *Environmental Statistics and Data Analysis*, Lewis Publishers.

[13] Pfanzagl, J. 1974. Investigating the Quantile of an Unknown Distribution, *Contributions to Applied Statistics*, W. J. Ziegler, ed. Birkhauser Verlag, Basel, pp. 111–126.

[14] Rousseeuw, P. J. and Bassett, G. W. 1990. The Remedian: A Robust Averaging Method for Large Datasets, *Journal of the American Statistical Association*, 85(409), 97–104.

[15] Serfling, R. J. 1980. *Approximation Theorems of Mathematical Statistics*, Wiley, N.Y.

[16] Tierney, L. 1983. A Space-Efficient Recursive Procedure for Estimating a Quantile of an Unknown Distribution, *SIAM Journal on Scientific and Statistical Computing,* 4(4), 706–711.

What is claimed is:

1. A computer-assisted method for providing an estimate of a summary of a data set generated by an unknown distribution, comprising:
    selecting a subset of data points from the data set;
    applying a scoring rule to each data point of the subset of data points based on a summary of a set of estimated relative locations and assigned weight for each data point to provide a separate score for each data point;
    selectively retaining data points to track based on the score for each data point; and
    providing by a processor an estimate of the summary of the data set based on the retained data points;
    wherein determining the estimated relative location for each point comprises determining the point's relative location to retained data point's, applying a linear interpolation to determine the point's relative location when the point is not at a boundary, and applying a nonlinear interpolation to determine the points relative location when the point in at a boundary.

2. The method of claim 1 wherein the summary of the data set is selected from the set comprising a cumulative density function, a probability density function, a parametric summary, a semi-parametric sunimaxy, and a non-parametric sununary of the data set.

3. The method of claim 1 wherein the summary of a set of estimated relative location is a single rank estimate.

4. The method of claim 1 wherein between 20 and 100 data points are tracked.

5. The method of claim 1 wherein the estimate is a set of probabilistic location.

6. The method of claim 5 wherein the estimate is a single point quantile estimate.

7. The method of claim 1 wherein the estiniatecl relative location for each data point is a function of the previous and current relative location and weights for each of the data points.

8. The method of claim 1 wherein the step of selectively retaining a data point includes retaining data points having the smallest individual score and discarding data points having the largest individual scores.

9. The method of claim 1 wherein 100 or less data points are retained.

10. A computer-assisted method for providing an estixnatc of a summary of a data set generated by an unknown distribution, comprising:
    (a) inputting m data points m a data set;
    (b) assigning a relative location to each said m data points;
    (c) assigning a weight to each said m data points;
    (d) inputting a subset, n, of the remaining data points;
    (e) estimating a relative location for each said m and n data points;
    (f) assigning a weight to each said m and n data points;
    (g) scoring each said m and n data points based on the relative location and weight for each of the m and n data points to provide an individual score for each of the m and n data points;
    (h) retaining a subset of said m and n data points, their associated estimated relative locations and weights, the subsets having fewer data points than m and n, the retained data points becoming the m data points;
    (i) repeating steps (d) through (h) until all data points have been analyzed;
    (j) providing the estimate of the summary of the data set based on said m data points.

11. The method of claim 10 wherein the summary of the data set is selected from the set comprising a cumulative density function, a probability density function, a parametric summary, a semi-parametric summary of the data set.

12. The method of claim 10 wherein the estimated relative location is a rank estimate.

13. The method of claim 12, wherein the rank assigned to each said m data point is a function of an actual rank of the m data points after said points have been partially or fully sorted.

14. The method for claim 13, wherein the rank assigned to each said m data point is the actual rank of the m data points after said points have been sorted.

15. The method of claim 12, wherein the estimated rank for each said m data point is a function that uses in part or in its entirety any or all of the following as arguments: said n data points, any of the rank estimates for said m data points, the total number of data points that have been inputted and the total number of data points in the data set.

16. The method of claim 15, wherein the estimated rank for each said m data point is the previous rank estimate for the data point plus the number of said n data points with a value lower than the said data point.

17. The method of claim 12, wherein the estimated rank for each said n data point is a function that uses in part or in its entirety the previous and current estimated ranks and weights for the said m data points.

18. The method of claim 17, wherein the estimated rank for one of the said n data points where said point is not a new maximum or minimum with regards to all of the data points considered up to this point, is a function of tbe current rank estimate and value of the said m data points which are immediately above and below said point.

19. The metbod of claim 18, wherein the estimated rank for one of n data points where said point is not immediately adjacent to the largest or smallest of the m data points, is a linear interpolation of the current rank estimate of the m data points which are immediately above and below the said point.

20. The method of claim 18, wherein the estimated rank for one of n data points where said point is immediately adjacent to either the largest or smallest of the m data points is a non-linear interpolation of the current rank estimate of the m data points which are immediately above and below said point.

21. The method of claim 17, wherein the estimated rank for each said n data point is equal to the value 1 where that point is smaller than all of the m data points and the remaining n data points and wherein the estimated rank for each said n data point where that point is smaller than all of the said m data points and larger than at least one of the remaining n data points, is a function of the value of the estimated rank of the smallest of the m data points and the n data points.

22. The method of claim 17, wherein the estimated rank for each n data point where that point is larger than all of the m data points and the remaining n data points, is equal to the total number of data points that have been inputted and where in the estimated rank for each n data point where the point is larger than all of the m data points and smaller than at least one of the remaining n data points, is a function of the value of the estimated rank of the largest of the m data points and the n data points.

23. The method of claim 12, wherein the initial assigned weight to the m data points is a function that uses in part or in its entirety any or all of the following as arguments: the total number of data points in the data set the total number of data points in the initial group, the number of data points that are to be inputted during each iteration, and the estimated rank of the m data points.

24. The method of claim 12, wherein the initial assigned weight to said m data points is equal to a constant.

25. The method of claim 12, wherein the weight assigned to the m and n data points, for all but the initial assigning of weights for the m data points, is a function that uses in part or in its entirety any or all of the previously assigned weights for the m data points, the current weights for the n data points and any of to estimated ranks for the m and n data points.

26. The method of claim 25, wherein the weight assigned to each of said m data points is equal to the weight initially assigned to that said point.

27. The method of claim 25, wherein the weight assigned to each of said n data paints is equal to a function of the distances, as defined by any metric, between any of the estimated ranks of said m data points and any of the estimated ranks of said remaining n data points and the actual values of said m and n data points.

28. The method of claim 27, wherein the weight assigned to each of n data points is equal to the smaller of the two distances, as defined byte absolute value of the distance derived by standard subtraction, between the estimated rank of said data point and the estimated rank of m data points which are immediately above and below said point.

29. The method of claim 12, wherein the subset of inputted data points, n, are determined by comparing elements of the n data points and said m data points being tracked.

30. The method of claim 29, wherein some or all data points in the subset that have a value exactly equal to the value of one of said m data points being tracked are used to calculate the estimated rank and assigned weight for said m data points being tracked and then discarded.

31. The method of claim 30, wherein all data points are to be discarded are discarded by assigning a score of minus infinity to said data points.

32. The method of claim 29, wherein two or more of the subset of inputted data points have the same value, all of the data points with equal value are used to calculate the estimated rank and assigned weight for m data points being tracked and all but one of said group are discarded, unless the group of data points with equal value are exactly equal to the value of one of said m data points being tracked m which case all of the data points in the group of equal data points will be discarded.

33. The method of claim 32, wherein all data points to be discarded are discarded by assigning a score of minus infinity to said data points.

34. The method of claim 12, wherein the subset of data points selected are the next n data points in the data set, as determined by the order in which they were recorded, unless there is less than n data points left in the data set, where the subset will be the remaining data points.

35. The method of claim 34, wherein the size of the subset of data points being selected in equal to one.

36. The method of claim 29, wherein the score for each m and n data points is a function that uses in part or in its entirety any or all of the following as arguments: any or all previous weights, ranks or scores, any or all previously assigned weights for said m data points, the current weight for said n data points, any of estimated ranks for m and n data points, actual values of the m and n data points, the total number of data points inputted and the total number of data points in the data set.

37. The method of claim 36, wherein the score for each m and n data points is a function of the estimated ranks and assigned weights for said m and n data points and the number of data points inputted.

38. The method of claim 37, wherein the score for each m and n data points is a function of estimated rank, assigned weight and a target rank, the target rank being a fixed proportion of the number of data points inputted, assigned to each said data point where said data point is not the largest or smallest of said m and n data points.

39. The method of claim 38, wherein the score for each m and n data points, where the said data point does not have the largest or smallest value of the m and n data points is equal to the distance, as defined by any metric, between the estimated rank and the target rank multiplied by any function of the assigned weight for said data point.

40. The method of claim 39, wherein the score for each m and n data points, where the said data point does not have the largest or smallest value of the m and n said data points is equal to the absolute value of the estinuted rank minus the target rank divided by the assigned weight for said data point.

41. The method of claim 37, wherein the score for each m and n data points is equal to zero, where the data point has the largest or smallest value of the m and n data points.

42. The method of claim 12, wherein a subset of m and n data points and their associated estimated ranks and weights are retained based on a comparison of the score calculated for each said data point.

43. The method of claim 42, wherein the m data points with the smallest score of m and n data points are retained along with their associated estimated ranks and assigned weights.

44. The method for claim 10, wherein the summary of the data set is a cumulative density ftinction estimated as a ftinction of the value and the estimated rank of said m data points.

45. The method for claim 44, wherein an unknown quantile is estimated as a function of the value and the estimated rank of said m data points.

46. The method for claim 45, wherein the estimate of an unknown quantile is equal to the value of the data point of said m data points with the smallest distance, as defined by any metric, between the estimated rank and the target rank associated with said quantile.

47. The method for claim 46, wherein the estimate of an unknown quantile is equal to the value of the data point of said m data points with the smallest distance, using the absolute value of the difference between the estimated rank and the target rank associated with this quantile, as defined by the proportion of the total data set associajed with this quantile.

* * * * *

UNITED STATES PATENT AND TRADEMARK OFFICE
CERTIFICATE OF CORRECTION

PATENT NO. : 7,076,487 B2
APPLICATION NO. : 10/121131
DATED : July 11, 2006
INVENTOR(S) : John C. Liechty, James P. McDermott and Dennis K.J. Lin It is certified that error appears in the above-identified patent and that said Letters Patent is hereby corrected as shown below:

Claim 1, Column 19, line 20:
DELETE:
after data "point's"
ADD:
after data --points--

Claim 1, Column 19, line 24:
DELETE:
after point "in"
ADD:
after point --is--

Claim 2, Column 19, line 28:
DELETE:
after semi-parametric "sunimaxy"
ADD:
after semi-parametric --summary--

Claim 2, Column 19, line 29:
DELETE:
after non-parametric "sununary"
ADD:
after non-parametric --summary--

Claim 7, Column 19, line 38:
DELETE:
after wherein the "estiniatecl"
ADD:
after wherein the --estimated--

Claim 10, Column 19, line 48:
DELETE:
after providing an "estixnatc"
ADD:
after providing an --estimate--

UNITED STATES PATENT AND TRADEMARK OFFICE
CERTIFICATE OF CORRECTION

PATENT NO. : 7,076,487 B2
APPLICATION NO. : 10/121131
DATED : July 11, 2006
INVENTOR(S) : John C. Liechty, James P. McDermott and Dennis K.J. Lin It is certified that error appears in the above-identified patent and that said Letters Patent is hereby corrected as shown below:

Claim 10, Column 19, line 51:
DELETE:
after points "m"
ADD:
after points --from--

Claim 19, Column 20, line 36:
DELETE:
after The "metbod"
ADD:
after The --method--

Claim 23, Column 21, line 2:
ADD:
after set --,--

Claim 27, Column 21, line 19:
DELETE:
after data "paints"
ADD:
after data --points--

Claim 28, Column 21, line 26:
DELETE:
after defined "byte"
ADD:
after defined --by the--

Claim 32, Column 21, line 48:
DELETE:
after tracked "m"
ADD:
after tracked --in--

Claim 35, Column 21, line 60:
DELETE:
after selected "in"
ADD:
after selected --is-

UNITED STATES PATENT AND TRADEMARK OFFICE
CERTIFICATE OF CORRECTION

PATENT NO. : 7,076,487 B2
APPLICATION NO. : 10/121131
DATED : July 11, 2006
INVENTOR(S) : John C. Liechty, James P. McDermott and Dennis K.J. Lin It is certified that error appears in the above-identified patent and that said Letters Patent is hereby corrected as shown below:

Claim 40, Column 22, line 27:
DELETE:
after value of the "estinuted"
ADD:
after value of the --estimated--

Claim 44, Column 22, line 42:
DELETE:
after density "ftinction"
ADD:
after density --function--

Claim 44, Column 22, line 43:
DELETE:
"ftinction"
ADD:
--function--

Claim 47, Column 22, line 59:
DELETE:
after data set "associajed"
ADD:
after data set --associated--

Signed and Sealed this

Seventeenth Day of October, 2006

JON W. DUDAS
*Director of the United States Patent and Trademark Office*